United States Patent [19]

O'Donnell

[11] Patent Number: 4,793,290

[45] Date of Patent: Dec. 27, 1988

[54] PET FOOD PROTECTING DEVICE

[76] Inventor: Timothy O'Donnell, 2501 Pepperwood, Long Beach, Calif. 90815

[21] Appl. No.: 119,963

[22] Filed: Nov. 13, 1987

[51] Int. Cl.$^4$ .............................................. A01K 5/01
[52] U.S. Cl. ...................................... 119/62; 119/55; 220/263
[58] Field of Search ............................. 119/55, 62, 63; 220/263

[56] References Cited

U.S. PATENT DOCUMENTS

| 493,145 | 3/1893 | Ames | 220/263 |
|---|---|---|---|
| 1,248,185 | 11/1917 | Smith | 220/263 |
| 3,121,419 | 2/1964 | Gillespie | 119/62 |
| 3,176,656 | 4/1965 | Bates | 119/62 |
| 4,263,876 | 4/1981 | Scott | 119/62 |

FOREIGN PATENT DOCUMENTS 54340 9/1834 Norway .............................. 220/263

Primary Examiner—Robert P. Swiatek
Attorney, Agent, or Firm—Charles H. Thomas

[57] ABSTRACT

An apparatus is provided for protecting the food of a house pet and is particularly useful when a pet is fed outdoors. The pet feeding deivce covers the food intended for a pet and protects the food from birds and undesirable pests. The pet feeding device employs a tray having a hinged lid and a treadle upon which the pet steps to open the lid. The treadle is connected to a pair of parallel arcuate ram arms which are carried rearwardly when the pet steps on the treadle. The arms travel between guide rollers and push upwardly against the underside of the lid to raise the lid to an open position when the treadle is depressed. When the pet is finished eating it releases the treadle, whereupon a spring aids in shutting the lid.

14 Claims, 2 Drawing Sheets

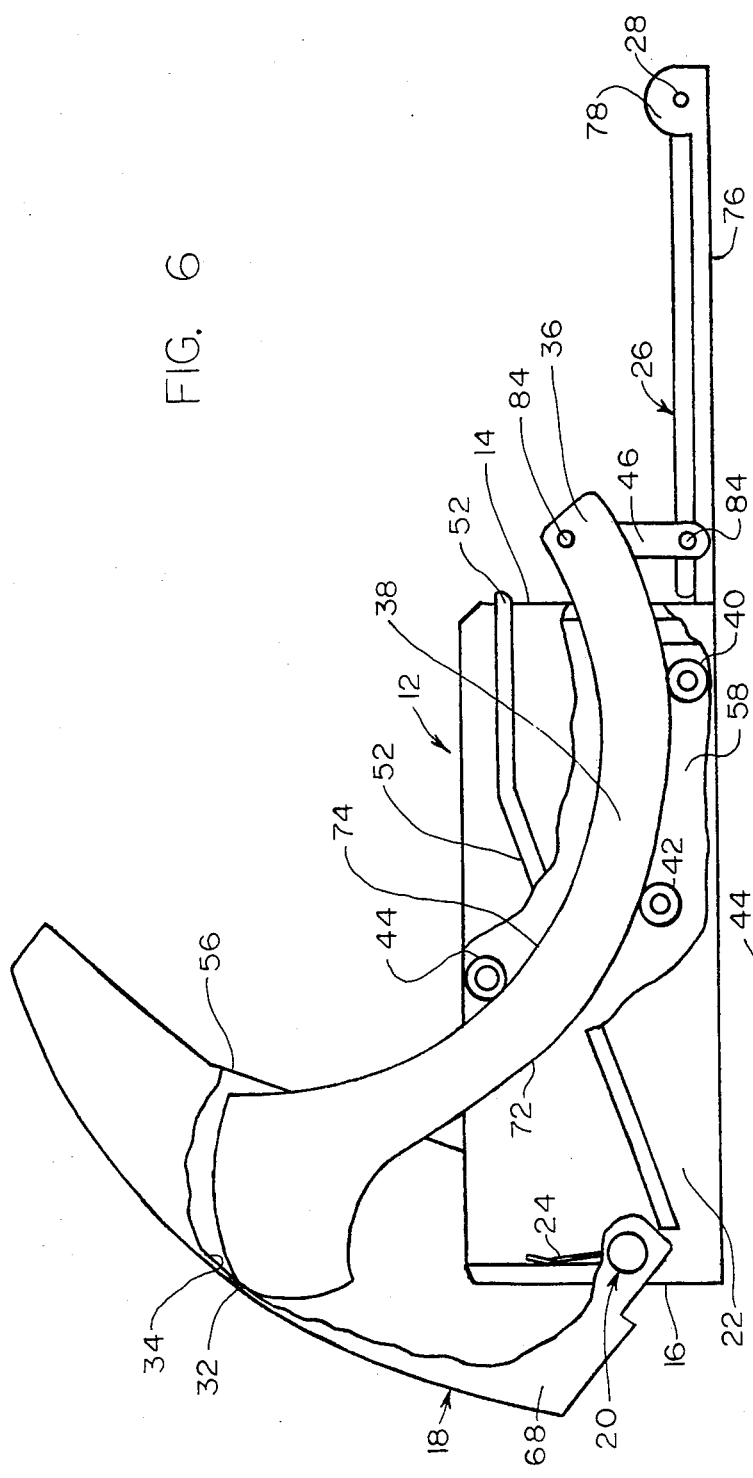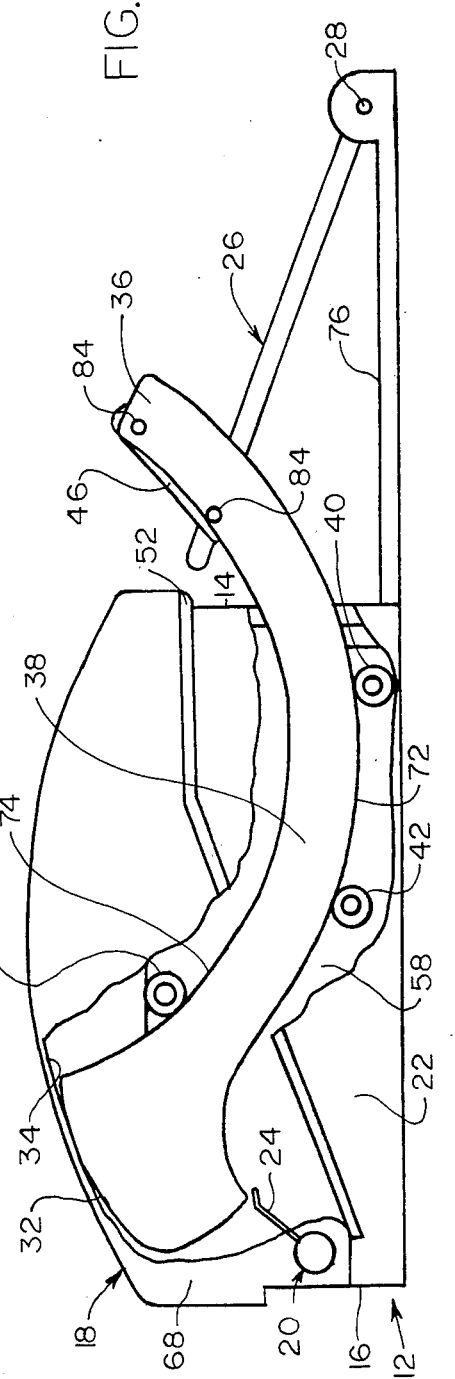

PET FOOD PROTECTING DEVICE

BACKGROUND OF THE INVENTION

1. Field of the Invention

The present invention is directed to a pet feeding and food protecting apparatus which is operated by an animal to be fed.

2. Description of the Prior Art

Domestic house pets form a part of many households not only in this country, but throughout the world. A conscientious owner of a pet will take considerable care to ensure that the pet is adequately fed and watered. Very typically, the owner of a pet, such as a dog or cat, will place food and water bowls on the floor or ground where they are readily accessible to the pet. The pet may not always want to eat and drink the entire contents of the food and water bowls immediately, and often will return to them to nibble and take water from time to time.

It is frequently desirable to provide a pet with food and water out of doors. In many instances an owner may have to leave the pet for a number of hours. When a pet is left outdoors it has the opportunity to exercise. Also, an owner will frequently leave a pet out of doors so that the pet will not defecate within a dwelling.

When a pet is left outdoors for an extended period of time, humane treatment requires that the pet be provided with food and water. However, when food and water bowls are left out of doors uncovered, the readily available food and water attracts birds, rodents and other undesirable pests. These unwelcome scavengers frequently spread food about the yard, porch or sidewalk in the vicinity of the location of the food and water bowls. As a result, pet food becomes spread over the yard and sidewalk and the area becomes littered as well with bird and other pest droppings. Furthermore, when the food and water intended for a pet are left uncovered, flies and insects often get into the pet's food.

To attempt to solve this problem various devices have been developed for covering or protecting the food and water of an animal to be cared for. Typically such food protecting devices employ a treadle or some other means by which an intelligent animal, such as a house pet, can lift a cover from atop a food container. However, the prior devices of this type which have been developed are often constructed in such a way that the lid or cover is pushed up into the face of the animal to be fed when it is opened. Pets become startled by such operating mechanisms and often develop an aversion to them. Also, the lid or cover of such conventional devices is frequently not opened sufficiently to effectively allow the pet access to the food and water which is covered when the pet feeding device is not in use.

SUMMARY OF THE INVENTION

A primary object of the present invention is to provide an animal feeding device which operates smoothly and efficiently, in response to actions of the animal to be fed, so as to uncover the food of the animal in a manner that avoids interfering with the animal's normal approach to the feeding bowls contained therein. The pet feeding apparatus of the invention is provided with a cover which is hinged at the lower rear portion of a feeding tray. When the pet approaches the feeding tray, it will necessarily place its paws upon an actuating treadle located in front of the tray in order to get close enough to the tray to eat the food which is located therewithin. The treadle is hinged along one edge at a treadle axis located remotely from the cover hinge axis. The treadle is connected at its opposite end to a ram mechanism. Once the pet depresses the treadle the ram mechanism is carried upwardly and to push against the underside of the cover, thereby rotating the cover clearly and completely out of the way. The pet is therefore not startled by a cover opening into its face and does not have to strugle in order to eat through only a partial opening. To the contrary, the ram mechanism of the pet feeding device carries the cover rearwardly, well clear of the animal's face. The unique shape of the ram head works like a cam thus causing the lid to open slowly at first and then gain speed only after it is well clear of the animal's face. The pet can thus eat happily and without distraction.

When the pet leaves the feeding apparatus, on the other hand, the release of pressure from the treadle allows a resiliently deflected spring mechanism to return the cover to a closed position atop the feeding tray. Because the closing cover forces the ram mechanism forward the ram mechanism must lift the treadle. The weight of the treadle thereby ensures that the cover closes smoothly without slamming shut. The closed cover thereby prevents scavengers, such as birds an rodents, from gaining access to food located within the feeding device.

In one broad aspect the present invention is a pet feeding apparatus comprising a food tray having a front and a rear, a tray cover hinged to the rear of the tray, a foot plate hinged at a horizontal axis forward of the tray for rotation between an upwardly and rearwardly inclined released disposition and an actuated disposition depressed downwardly from the release disposition. A ram mechanism is provided having a first end oriented to bear against the underside of the tray cover and a second end. Connection means couple the second end of the ram mechanism to the foot plate and guide means on the food tray engage with the ram mechanism to constrain the ram mechanism to move in a concave upwardly facing arcuately curved path. Depression of the foot plate to an actuated disposition carries the ram upwardly to lift the cover in rotation above the tray. Release of the foot plate allows the cover to drop in counter-rotation onto the tray, thereby returning the foot plate to the released disposition.

The ram mechanism forms a very critical part of the invention. While the ram mechanism may take various forms, it preferably is comprised of a pair of ram arms on opposite sides of the food tray. Each of the ram arms is configured with upper and lower edges formed in circular arcs of different radii centered about a common point. The food tray is comprised of opposing parallel sides extending between the transverse tray front and tray rear. The guide means are preferably comprised of a plurality of rollers rotatably mounted on each of the opposing sides of the food tray to bear against both the upper and lower edges of the ram arms. In the preferred embodiment two rollers support the lower edge of each of the ram arms and a third roller rides against the upper edge of each of the ram arms on the opposing sides of the food tray. The connection means which joins the second ends of the ram arms to the foot plate is comprised of a pair of connection links hingedly coupled to the ram arms and to the foot plate.

The tray cover is hinged to the tray by means of a pair of coaxial cover hinge pins mounted on the opposing sides of the food tray. Preferably each cover hinge pin is keyed to rotate with the cover and carries a leaf spring which bears against and is resiliently deflected by the rear of the tray when the cover is lifted in rotation above the tray. The resilient deflection of the leaf spring biases the tray toward a closed position. The cover is hinged near the bottom at the rear of the tray, so that when the cover is raised by the ram arms, it is carried upwardly and rearwardly with a visor-like movement. Depression of the foot plate by the animal to be fed therefore does not thrust the cover directly upwardly toward the animal's face. To the contrary, the cover is pushed upwardly and rearwardly away from the animal's face and to a position allowing the animal unobstructed access to the enclosure of the foot container.

The invention may be described with greater clarity and particularity by reference to the accompanying drawings.

DESCRIPTION OF THE DRAWINGS

FIG. 5 is a side elevational view of the animal feeding device of FIG. 1 shown in the closed position with portions broken away to allow illustration of interior components of the device.

FIG. 6 is a side elevational view of the animal feeding device of FIG. 1 shown in the open position and with portions broken away to allow illustration of interior components of the device.

DESCRIPTION OF THE EMBODIMENT

Figure 1:
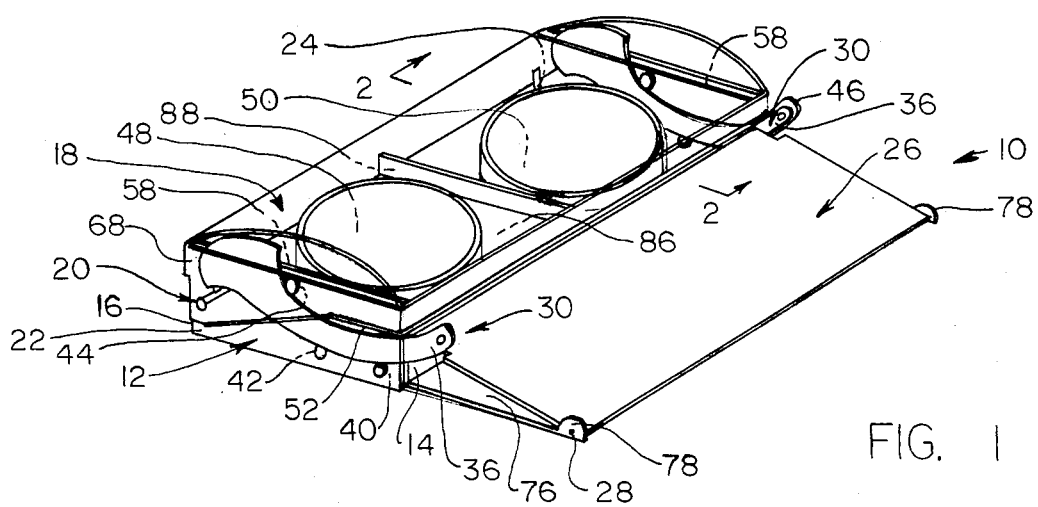
FIG. 1 is a perspective view of the animal feeding device of the invention shown with the cover closed.
Figure 2:
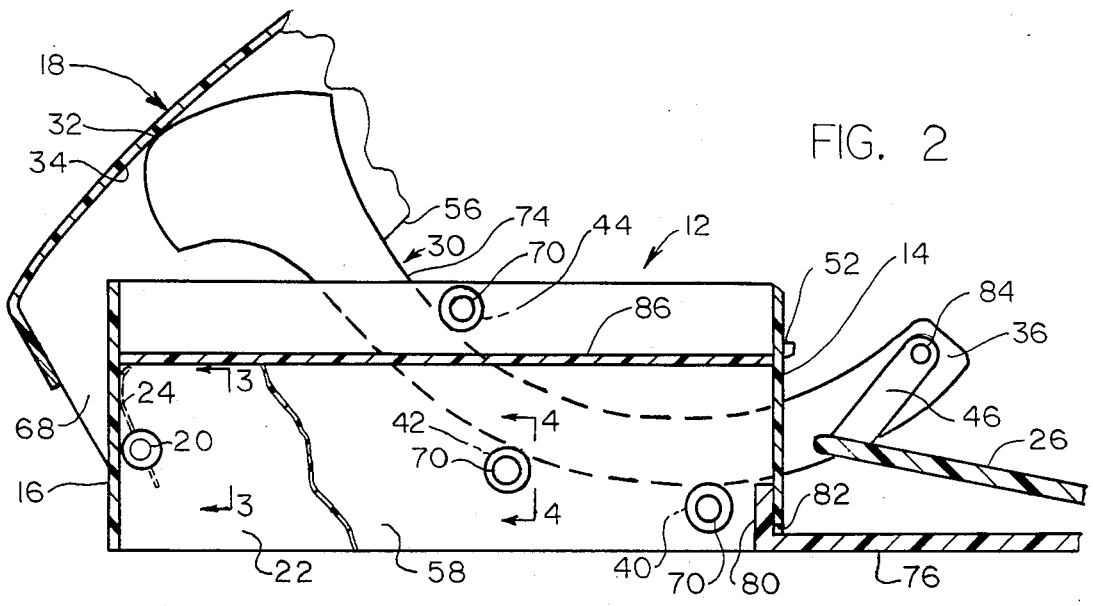
FIG. 2 is a sectional elevational view taken along the lines 2—2 of FIG. 1 showing the cover of the animal feeding device partially open.
Figure 3:
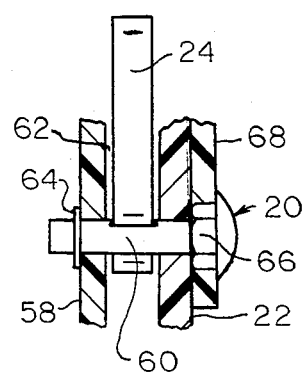
FIG. 3 is an elevational detail taken along the lines 3—3 of FIG. 2.

FIG. 1 illustrates a device 10, which may be considered to be both an animal feeding device and a pet food protecting device. The animal feeding device 10 is comprised of a hollow generally rectangular box-shaped food tray or container 12 having a front wall indicated at 14, a rear wall indicated at 16, and outside side walls 22 that extend perpendicular to the front wall 14 and the rear wall 16 as best illustrated in FIGS. 2, 5 and 6. A visor-like lid or cover 18 is hinged to the rear of the food tray 12 near the lower rear extremity of the outside side walls 22 by means of cover hinge pins 20. The cover hinge pins 20 are coaxially aligned and extend inwardly through the opposite outer side walls 22. The lid 18 rotates about a horizontal lid axis defined by the cover hinge pins 20 between a lifted open position as depicted in FIG. 6, and a lowered closed position as depicted in FIG. 5. A leaf spring 24, depicted in detail in FIG. 3, is employed to bias the lid 18 toward the lowered, closed position of FIG. 5 in a manner hereinafter to be described.

A foot plate or treadle 26 formed as a flat, rectangular slab is located in front of the food tray 12 and is hinged at a horizontal treadle axis defined by treadle hinge pins 28. The treadle axis defined by the treadle hinge pins 28 is spaced forwardly from the front wall 14 of the food tray 12. The treadle 26 is rotatable between a raised position inclined upwardly from the treadle axis toward the front wall 14 of the food tray 12, as depicted in FIGS. 1 and 5, and a lowered position depicted in FIG. 6.

A very important feature of the invention is the ram mechanism which is comprised of arcuately, upwardly curved concave ram arms 30. Each of the ram arms 30 has a rear end portion 32 which bears against the underside 34 of the lid 18 and a forward end portion 36 which projects forwardly beyond the front 14 of the food tray 12. Each of the parallel ram arms 30 also has an intermediate portion 38 of uniform width between the rear end portion 32 and the forward end portion 36. Guide means in the form of a plurality of rollers 40, 42 and 44 are provided on both sides of the food tray 12 for guiding the ram arms 30 to move in circular, arculate fore and aft paths. The forward end portions 36 of the ram arms 30 pass through elongated vertical slots in the front wall 14 proximate to the side walls 22.

Connection means in the form of a pair of flat oblong connecting links 46 are provided to join the forward portions 36 of the ram arm 30 to the treadle 26 remote from the treadle hinge pins 28. Depression of the treadle 26 to its lowered position pushes the ram arms 30 upwardly to lift the lid 18 to its open position, as depicted in FIG. 6.

The lid 18, the food tray 12, the ram arms 30 and the treadle 26 are all preferably comprised of transparent, lucite plastic. Since the lid 18 is transparent, an animal is able to see food and water in the bowls 48 and 50 which are positioned atop a platform 86 within the enclosure of the food tray 12. The bowls 48 and 50 are removable for purposes of cleaning and are omitted from FIG. 2.

A narrow, bead-like bearing ledge 52 is formed of a plastic lucite molding and is secured by glue to the pair of opposing, parallel generally rectangular-shaped fore and aft side walls 22 which form the outer exposed sides of the food tray 12 and extend between the front 14 and the rear 16 thereof. The lower edge 56 of the lid 18 rests upon the bearing ledge 52 when the lid 18 is closed. The bearing ledge 52 also serves the purpose of preventing the animal from lifting the lid 18 other than by depressing the treadle 26.

Within the food tray 12 and proximate to each of the outer sidewalls 22 there is a vertically oriented interior partition 58. Each of the partitions 58 is uniformly spaced from and located parallel to the proximately disposed outer side wall 22 to form a gap 62 therebetween, as best depicted in FIGS. 1 and 3. The interior partitions 58 are secured by glue to the front wall 14 and the back wall 16 and are spaced approximately five sixteenths of an inch from the outer side wall 22 located proximate thereto. The cover hinge pins 20 have shanks 60 which extend through transversely aligned openings in the closely spaced outer walls 22 and the interior partitions 58 and span the five sixteenths inch gap 62 indicated in FIG. 3. Within the enclosure of the animal feeding device 10 the cover hinge pins 20 are secured by C-rings 64 which snap into retaining grooves in the outer peripheries of the hinge pin shanks 60 in the manner depicted in FIG. 3. As illustrated in FIG. 3, the undersides of the heads of the cover hinge pins 20 are formed with hexagonal keys 66 which seat in corresponding hexagonal openings in the side walls 68 of the lid 18. Thus, as the lid 18 is rotated between its open position of FIG. 6 and its closed position of FIG. 5, the cover hinge pins 20 are carried in rotation since they are keyed to the lid 18 by means of the hexagonal keys 66 that are seated in the side walls 68 of the lid 18. The shanks 60 of the cover hinge pins 20 pass through circular openings in the outer sidewalls 22 and in the inner partitions 58 and are thereby engaged in each of the opposing sides of the food tray 12.

Each of the shanks 60 of the cover hinge pins 20 is provided with a longitudinal slot therethrough adapted to receive an elongated generally rectangular leaf spring 24. One end of each leaf spring 24 is inserted into the slot in a shank 60. The end of the leaf spring 24 which is inserted into the slot is inelastically deformed to a slight degree with ripple-like bends so that the leaf spring 24 will not fall out of the slot in the hinge pin shank 60. The other end of the leaf spring 24 extends upwardly. As the lid 18 is opened, as depicted in FIGS. 2 and 6, the leaf springs 24 are rotated with the cover hinge pin 20 and are carried into contact with the rear wall 16 of the food tray 12. As illustrated in FIG. 2, the leaf springs 24 are resiliently deflected by the rear wall 16 so as to urge the lid 18 to return toward its lowered, closed position.

Figure 4:
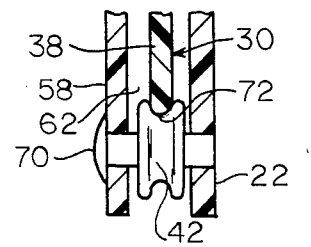
FIG. 4 is an elevational, sectional detail taken along the lines 4—4 of FIG. 2.

The guide rollers 40, 42 and 44 are all identical in configuration and are likewise secured in the gaps 62 between the outer food tray walls 22 and the adjacent interior partitions 58, in the manner depicted in FIG. 4. Each of the rollers 40, 42 and 44 is a disk-like generally spool-shaped structure and rotates on the shank of a roller mounting pin 70. The rollers 40 and 42 support the rounded, lower edges 72 of the ram arms 30, while the rollers 44 bear against the correspondingly curved upper edges 74 of the ram arms 30. The rollers 40, 42 and 44 all support and guide the ram arms 30 and bear against the intermediate portions 38 thereof.

Since the intermediate portions 38 of the ram arms 30 are of uniform width, the rollers 40 and 42 will always remain in contact with the lower edges 72 of the intermediate ram arm portions 38 while the rollers 44 will always remain in contact with the upper edges 74 of the ram arms 30. The rollers 40 and 42 are located below the curved ram arms 30, while the rollers 44 are located thereabove. The intermediate portions 38 of the ram arms 30 are supported from beneath by the rollers 40 and 42 and are constained from above by the rollers 44 when the treadle 26 is moved between its raised and lowered positions.

The treadle 26 is connected by treadle hinge pins 28 to a stationary, flat, rectangular lucite base plate 76 located therebeneath. The stationary base plate 76 is horizontally disposed beneath the treadle 26 and has a pair of upstanding vertical ears 78 arranged in lateral alignment with each other. The treadle hinge pins 28 project through the ears 78 in coaxial alignment with each other and into the structure of the treadle 26 at one end thereof. The treadle hinge pins 28 thereby hingedly join the treadle 26 to the base plate 76.

The opposite end of the base plate 76 is turned upwardly in a lip 80 which is located behind an opening 82 beneath the front wall 14 of the food tray 12, as best illustrated in FIG. 2. To assemble the animal feeding device 10, the base plate 76 is positioned flat on a supporting surface, and the food tray 12 is lowered so that the upstanding lip 80 is disposed within the enclosure of the food tray 12 and resides in abutment against the interior surface of the front wall 14 in the manner depicted in FIG. 2. Once the base plate 76 is in position, the connecting links 46 are secured to both the second or forward ends 36 of the ram arms 30 and to the structure of the treadle 26 remote from the hinge pins 28 by means of fastening pins 84.

To utilize the animal feeding device 10 a user assembles the component parts together in the manner depicted in the drawing figures and positions the food and water bowls 48 and 50 on the elevated, horizontal platform 86 that is located between the front and rear walls 14 and 16, respectively, and the interior partitions 58. The platform 86 is removable for cleaning. A central, fore and aft brace 88 is located beneath the horizontal partition 86 and provides support thereto. The brace 88 also serves to stablize the front and rear walls 14 and 16 and to hold those walls parallel to each other.

With food and water in the bowls 48 and 50 a pet may approach the pet feeding device 10 at any time. Because the lid 18 is transparent the pet is able to readily observe any food and water in the bowls 48 and 50.

As the pet approaches the food protecting device 10, the animal will necessarily place one or both of its front paws on the treadle 26, thereby depressing the treadle from its normal, upwardly and rearwardly inclined deactuated position, depicted in FIGS. 1 and 5, to an actuated position depressed downwardly in rotation from the deactuated position, as depicted in FIGS. 2 and 6. As the treadle 26 is depressed, the guide rollers 40, 42 and 44 contact the edges 72 and 74 of the ram arms 30 to constrain the ram arms 30 to move in arcuate paths within the gaps 62 between the outer sidewalls 22 and the fore and aft interior partitions 58 located adjacent thereto. As the treadle 26 is depressed, the ram arms 30 move away from the treadle axis defined by the treadle hinge pins 28 and the rear ends 32 of the ram arms 30 are driven upwardly and to push the lid 18 open in counterclockwise rotation, as viewed in FIGS. 2, 5 and 6. The movement of the ram arms 30 in their arcuate paths pushes the lid 18 from the lowered, closed position depicted in FIG. 5 into its raised, opened position depicted in FIG. 6. When the lid 18 is raised in this manner the pet to be fed will stand with its forepaws pressing downwardly on the treadle 26. The pet can then readily eat and drink from food and water bowls 48 and 50. When the lid 18 is in the raised position of FIG. 6 the contents of the food tray or container 12 are fully exposed to allow the pet unrestricted access thereto.

When the pet has finished eating and drinking, it will leave the device 10, removing its paws from the treadle 26. Since the lid 18 was raised to its elevated, lifted position of FIG. 6, the spring 24 is resiliently deformed, and is deflected against the interior surface of the rear wall 16, as depicted in FIG. 2. The rear portion of the far partition 58 is broken away in FIG. 2 to facilitate observation of the deflected spring 26. Release of the treadle 26 allows the spring 24 to push against the rear wall 16 and rotate the cover hinge pins 20 in a clockwise direction, as viewed in FIGS. 2 and 6. Since the cover hinge pins 20 are keyed to the lid 18, the lid 18 is likewise turned in clockwise rotation as well. When the center of gravity of the lid 18 passes to the right of vertical alignment with the cover hinge pins 20, the force of gravity will also cause the lid 18 to drop into a fully closed position with its lower edge 56 resting upon the bearing ledge 52, as depicted in FIGS. 1 and 5. The closing of the lid 18 will be slowed somewhat by the resistance encountered as a result of raising the treadle 26. This tends to keep the lid from slamming shut. The pet feeding device 10 thereupon protects the pet's food and water in the bowls 48 and 50 from birds and other pests.

Undoubtedly, numerous variations and modifications of the invention will become readily apparent to those familiar with pet feeding accessories. Accordingly, the scope of the invention should not be construed as limited to the specific embodiments illustrated and described herein, but rather is defined in the claims appended hereto.

I claim:

1. A pet feeding apparatus comprising a food tray having a front and rear, a tray cover hinged to said rear of said tray, a foot plate hinged at a horizontal axis forward of said front of said tray for rotation between an upwardly and rearwardly inclined released disposition and an actuated disposition depressed downwardly from said released disposition, a ram mechanism having a first end oriented to bear against the underside of said tray cover and a second end, connection means coupling said second end of said ram mechanism to said foot plate, and guide means on said food tray engaged with said ram mechanism to constrain said ram mechanism to move in a concave upwardly facing arcuately curved path, whereby depression of said foot plate to said actuated disposition carries said ram mechanism rearwardly and upwardly to lift said cover in rotation above said tray and release of said foot plate allows said cover to drop in counter-rotation onto said tray, thereby returning said foot plate to said released disposition.

2. Apparatus according to claim 1 wherein said ram mechanism is comprised of a pair of ram arms on opposite sides of said food tray each configured with upper and lower edges forming circular arcs of different radii centered about a common point, and wherein said food tray is comprised of opposing parallel sides extending between said tray front and said tray rear, and said guide means are comprised of a plurality of rollers rotatably mounted on each of said opposing sides of said food tray to bear against both said upper and said lower edges of said ram arms.

3. Apparatus according to claim 2 wherein two rollers support said lower edge of each of said ram arms and a third roller rides against said upper edge of each ram arm on said opposing sides of said food tray.

4. Apparatus according to claim 2 wherein said connection means is comprised of a pair of connecting links hingedly coupled between said ram arms and said foot plate.

5. Apparatus according to claim 4 wherein said tray cover is hinged to said tray by means of a pair of coaxial cover hinge pins mounted on said opposing sides of said food tray, and each cover hinge pin is keyed to rotate with said cover and carries a leaf spring which bears against and is resiliently deflected by said rear of said tray when said cover is lifted in rotation above said tray.

6. An animal feeding device comprising a hollow food tray having a front and a rear, a lid hinged to said rear of said food tray to rotate about a horizontal lid axis between a lifted open pet feeding position and a lowered closed pet feeding position and biased toward said lowered closed pet feeding position, a treadle located in front of said food tray and hinged at a horizontal treadle axis spaced forwardly from said front of said food tray and rotatable between a raised position inclined upwardly from said treadle axis toward said front of said food tray and a lowered position, ram means arcuately curved concave upwardly and having a rear portion bearing against the underside of said lid and a forward portion projecting forwardly beyond said front of said food tray, guide means on said food tray for guiding said ram means to move in a circular arcuate fore and aft path, and connection means joining said forward portion of said ram means to said treadle, whereby depression of said treadle to said lowered position pushes said ram means rearwardly to lift said lid to said open position.

7. An animal feeding device according to claim 6 wherein said food tray has opposing parallel sides extending between said tray front and said tray rear and said ram means is comprised of a pair of parallel ram arms each having intermediate portions of uniform width between a rear portion and a forward portion, and said guide means is comprised of a plurality of rollers mounted on each of said opposing sides of said food tray, whereby each of said ram arms rides on a plurality of rollers when said treadle moves between said raised and lowered positions.

8. An animal feeding device according to claim 7 further comprising a pair of lid hinge pins coaxially aligned along said lid axis and keyed to said lid and rotatably engaged in each of said opposing sides of said food tray, and each of said lid hinge pins carries a leaf spring which is rotated into contact with and resiliently deflected by said rear of said food tray when said lid is rotated to its lifted open position, whereby said leaf springs urge said lid toward its lowered, closed position.

9. An animal feeding device according to claim 6 further comprising a stationary base plate located beneath said treadle and having a pair of ears with coaxial treadle hinge pins projecting therethrough along said treadle axis to hingedly join said treadle to said base plate and releasable means for engaging said front of said food tray.

10. An animal feeding device according to claim 6 wherein said connection means is comprised of a pair of links extending between said forward portion of said ram means and said treadle at locations remote from said treadle axis.

11. A pet food protecting device comprising a food container having a lid hinged thereto for rotation about a horizontal lid axis and movable between a raised position exposing the contents of said food container and a lowered position covering the contents of said food container, a treadle hinged at a horizontal treadle axis remotely located from said lid axis and wherein said treadle extends toward said food container and is movable in rotation about said treadle axis between a deactuated position inclined from said treadle axis upwardly toward said food container and an actuated position depressed downwardly in rotation from said deactuated position, ram means arcuately curved concave upwardly and bearing against the underside of said lid at one end and projecting toward said treadle at an opposite end, guide means on said food container engaging said ram means to constrain said ram means to move in an arcuate path toward and away from said treadle axis, and connecting means joining said opposite end of said ram means to said treadle between said lid axis and said treadle axis, whereby depression of said treadle from said deactuated to said actuated position drives said ram means to move in said arcuate path to push said lid into said raised position.

12. A pet food protecting device according to claim 11 wherein said ram means is comprised of a pair of curved arms each having portions of uniform width between the aforesaid ends thereof, and said guide means is comprised of a plurality of rollers on opposite sides of said food container both above and below said curved arms of said ram means, whereby said portions of uniform width of said ram means travel between said rollers.

13. A pet food protecting device according to claim 12 further comprising spring means acting between said food container and said lid to bias said lid from said raised position toward said lowered position.

14. A pet food protecting device according to claim 11 further comprising a base plate disposed adjacent to said food container and releasably coupled thereto, and said base plate is hinged to said treadle at said treadle axis, wherein said base plate remains stationary as said treadle moves between said deactuated and said actuated positions.

* * * * *